United States Patent
Tsai et al.

(10) Patent No.: US 8,553,316 B2
(45) Date of Patent: Oct. 8, 2013

(54) E-PAPER DISPLAY DEVICE AND METHOD FOR MANUFACTURING THE SAME

(75) Inventors: Yao-Chou Tsai, Hsinchu (TW); Chia-Chun Yeh, Hsinchu (TW); Fang-An Shu, Hsinchu (TW); Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 13/351,489

(22) Filed: Jan. 17, 2012

(65) Prior Publication Data

US 2012/0194898 A1      Aug. 2, 2012

(30) Foreign Application Priority Data

Jan. 27, 2011    (TW) .............................. 100103154 A

(51) Int. Cl.
*G02B 26/00*    (2006.01)
(52) U.S. Cl.
USPC .......................................... 359/296; 345/107
(58) Field of Classification Search
USPC ......... 359/237, 290, 296; 204/600; 345/107; 430/32, 38
See application file for complete search history.

(56) References Cited

U.S. PATENT DOCUMENTS

2004/0005436 A1*   1/2004   Mori et al. ................... 428/141

FOREIGN PATENT DOCUMENTS

| CN | 101710221 | 5/2010 |
| CN | 201654749 | 11/2010 |
| JP | 2010049205 A * | 3/2010 |

OTHER PUBLICATIONS

Microsoft Translator machine created English translation of Japanese publication JP02010049205A from WIPO Patentscope website, http://patentscope.wipo.int/search/en/detail.jsf created Jan. 10, 2013.*
China Patent Office, "Office Action", Jul. 31, 2013.

* cited by examiner

*Primary Examiner* — Darryl J Collins
*Assistant Examiner* — Gary O'Neill
(74) *Attorney, Agent, or Firm* — WPAT, PC; Justin King

(57) ABSTRACT

A display device includes a substrate, a driving circuit, an E-paper display layer and a protective coating layer. The driving circuit is arranged on the substrate. The E-paper display layer is disposed on and driven by the driving circuit. The protective coating layer is coated on and in contact with the E-paper display layer. The protective coating layer can provide protection and better optical performance, and it is advantageous to the manufacturing method to overcome the problems such as bubbles and low light transmittance occurring in the conventional manufacturing method.

20 Claims, 2 Drawing Sheets

E-PAPER DISPLAY DEVICE AND METHOD FOR MANUFACTURING THE SAME

FIELD OF THE INVENTION

The present invention relates to a display device and associated manufacturing method, and more particularly to an E-paper display device and associated manufacturing method.

BACKGROUND OF THE INVENTION

Referring to FIG. 1, a conventional E-paper display device 50 usually includes an E-paper display layer 54 formed on or adhered to a surface of a thin film transistor (TFT) substrate 52. Since the E-paper display layer 54 is extremely sensitive to the moisture and easily damaged due to the moisture, a protective sheet 56 made of a composite material is formed to cover the E-paper display layer 54. Then, the gap between the protective sheet 56 and the TFT substrate 52 is filled with sealant 58 to entirely separate the E-paper display layer 54 from the environment. The sealant 58 can assist the bonds between the protective sheet 56 and the TFT substrate 52 to prevent the moisture from entering the E-paper display device 50.

The protective sheet 56 may be a polymer substrate with coating treatment. Thus, the protective sheet 56 can prevent moisture, absorb ultraviolet rays, and reduce glare. The polymer substrate, for example, is made of polyethylene terephthalate (PET).

In the conventional E-paper display device 50, the protective sheet 56 is provided on the E-paper display layer 54 by adhering the protective sheet 56 to the surface of the E-paper display layer 54. During the bonding step, bubbles are easily produced between the protective sheet 56 and the E-paper display layer 54. These bubbles would affect the performance of the E-paper display device 50. Moreover, the optical characteristics of PET is not good enough so that the visible light transmittance of the protective sheet 56 is merely 85%, resulting in that it is difficult to improve the brightness or contrast of the E-paper display device 50. In addition, when the temperature increases, the polymer substrate of the protective sheet 56 may also have the problem of yellowing or deforming over time.

Therefore, an improved E-paper display device and associated manufacturing method are required to obviate the drawbacks encountered from the prior art.

SUMMARY OF THE INVENTION

The present invention provides a display device having a protective coating layer without polymer substrate. Therefore, no bubbles will be produced in the display device. The brightness or contrast of the display device is thus improved, and the problems caused by the polymer substrate of the protective sheet in the conventional display device are avoided.

The present invention also provides a method for manufacturing the display device, which has the protective coating layer.

In accordance with an aspect of the present invention, a display device includes a substrate, a driving circuit, an E-paper display layer and a protective coating layer. The driving circuit is formed on the substrate. The E-paper display layer is formed on and driven by the driving circuit. The protective coating layer is formed on the E-paper display layer by a coating method.

In accordance with another aspect of the present invention, a method for manufacturing a display device is also provided. According to the method, a driving circuit is formed on a substrate. Then, an E-paper display layer is formed on the driving circuit wherein the E-paper display layer is driven by the driving circuit. Finally, a protective coating layer is formed on the E-paper display layer by a coating method to finish the manufacture of the display device.

In the above-mentioned display device and manufacturing method, the protective coating layer is directly formed on the E-paper display layer by a coating method and the step of adhering the protective sheet to the E-paper display layer according to the conventional method is eliminated. Therefore, bubbles occurring in the prior arts are not generated. Accordingly, the performance of the display device is improved. In addition, since the protective coating layer is formed by a coating method, it is possible to adopt suitable materials with high light transmittance or deformation resistance to form the protective coating layer. Therefore, it is helpful to improve the brightness or contrast of the display device, and the problem of yellowing or deforming is overcome.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
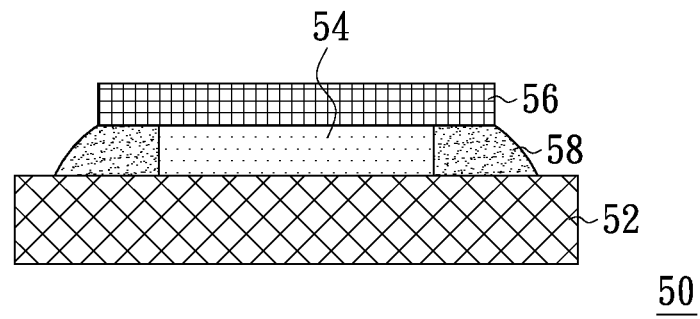
FIG. 1 is a cross sectional schematic view of a conventional e-paper display device.
Figure 2A:
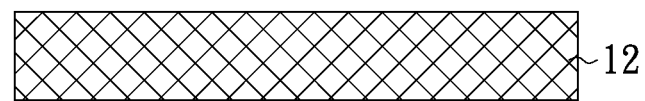
FIGS. 2A-2C are cross sectional schematic views illustrating a method for manufacturing an E-paper display device according to an embodiment of the present invention.
Figure 2B:
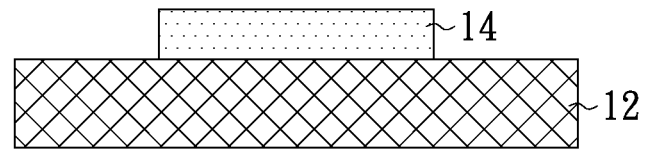
Figure 2C:
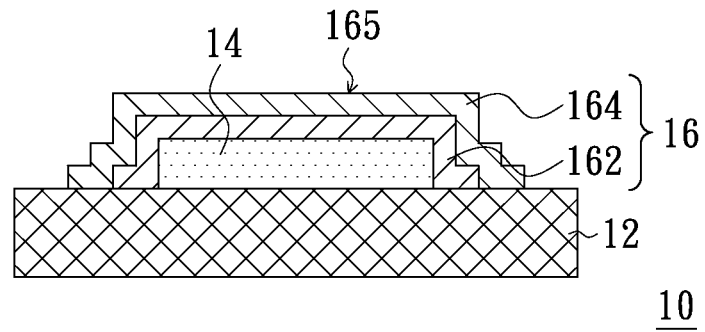

FIGS. 2A-2C are cross sectional schematic views illustrating steps of a method for manufacturing an E-paper display device according to an embodiment of the present invention. Referring to FIG. 2A, a substrate 12 is provided and a driving circuit (not shown) is arranged on the substrate 12. The substrate 12 may be a glass substrate or a flexible plastic substrate, and the driving circuit may include thin film transistor (TFT) array. Certainly, other known substrate and driving circuit are applicable to the present E-paper display device without difficulty.

Referring to FIG. 2B, an E-paper display layer 14 is formed on the substrate 12 with the driving circuit. The E-paper display layer 14 can be, but not limited to, an electrophoretic display layer.

Referring to FIG. 2C, a protective coating layer 16 is then formed on surfaces of the E-paper display layer 14 by a coating method thereby obtaining an E-paper display device 10. The protective coating layer 16 may be, but not limited to be formed by low temperature coating technology to avoid damage of any temperature-sensitive element. The protective coating layer 16 is used to protect the E-paper display layer 14 from being affected by environment. For example, the protective coating layer 16 can block moisture. Furthermore, the protective coating layer 16 can improve optical performance of the E-paper display device 10. For example, the protective coating layer 16 can absorb ultraviolet rays or reduce glare. In an embodiment, the protective coating layer 16 is a multiple layer film or a composite film which includes a moisture barrier film 162 and an optical film 164, but the present invention is not limited to the embodiment. The moisture barrier film 162 is disposed on the E-paper display layer 14, and the optical film 164 is disposed on the moisture barrier film 162. In detail, the moisture barrier film 162 can resist the environment moisture to affect the E-paper display layer 14, and is made of waterproof materials such as inorganic ceramics, organic polymers or organic/inorganic composites. The inorganic ceramics, for example, include silicon oxide ($SiO_x$) or silicon nitride ($SiN_x$). The organic polymers, for example, include parylene or polypropylene. The organic/inorganic composites, for example, include amorphous silicon/parylene composite, or polypropylene/polyacrylate/aluminum composite. It is to be noted that the materials are not limited to the above-mentioned materials, and other transparent materials suitable for coating process and providing good moisture resistance are applicable. The person skilled in the art may give other materials without difficulty according to the description. The optical film 164 can absorb or block ultraviolet rays. Examples of the optical film 164 include non-interference cut-off filter capable of absorbing ultraviolet rays or interference cut-off filter capable of interfering ultraviolet rays. When the optical film 164 is the interference cut-off filter, the ultraviolet rays are blocked because of the interference effect. On the other hands, the interference cut-off filter may include multiple refractive films having varying refractive indexes. Examples of the materials of the refractive films include magnesium fluoride ($MgF_2$), zirconium dioxide ($ZrO_2$), and cerium(III) fluoride ($CeF_3$). Furthermore, the surface 165 of the optical film 164 can be treated or roughened to have rough surface which allows light scattering so as to reduce glare. Alternatively, an anti-glaring film (not shown) can be formed on the surface 165 of the optical film 164 to achieve the anti-glaring effect. Moreover, the outer surface of the anti-glaring film can be further treated or roughened to achieve better anti-glaring effect.

It is to be noted that the optical film 164 may adjust optical performance of the E-paper display device 10 and further provide moisture barrier function when it is composed of multiple-layer film. Therefore, the optical film 164 further enhances the moisture resistance due to its multiple-layer structure.

According to the above-described method, the protective coating layer 16 is directly formed on the E-paper display layer 14 by coating. The steps of adhering the protective sheet to the E-paper display layer and filling in the sealant in the prior arts are omitted. Therefore, no bubbles are generated between the protective coating layer 16 and the E-paper display layer 14, and the method is simplified. Accordingly, the performance and yield rate of the E-paper display device 10 are improved. In addition, since the protective coating layer 16 is formed by coating, it is possible to select better materials with high light transmittance or deformation resistance rather than the thick polymer substrate to form the protective coating layer 16. Therefore, it is helpful to improve the brightness or contrast of the E-paper display device. Furthermore, the problem of yellowing or deforming caused by the polymer substrate of the protective sheet is overcome.

Figure 3A:
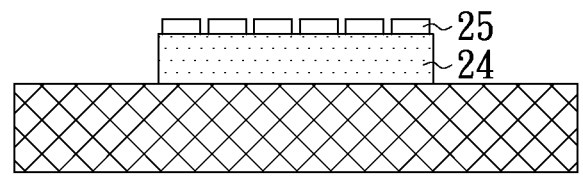
FIGS. 3A-3B are cross sectional schematic views illustrating a method for manufacturing an E-paper display device according to another embodiment of the present invention.
Figure 3B:
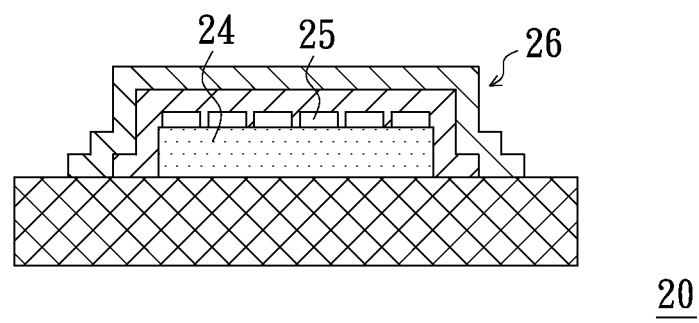

The manufacturing method can be applied to a color E-paper display device. The associated steps are illustrated in FIGS. 3A and 3B. Referring to FIG. 3A, after an E-paper display layer 24 is formed on a substrate with a driving circuit as described with reference to FIGS. 2A and 2B, a color filter layer 25 including a color filter array for different primary or mixed color lights is formed on the E-paper display layer 24. The color filter layer 25 may be implemented by a thermal transfer color filter layer and provided by a thermal transfer method. Alternatively, the color filter layer 25 may be produced by other known method, for example, pigment dispersion method, printing method or electrodeposition method.

Then, a protective coating layer 26 is formed on the color filter layer 25 and the E-paper display layer 24 to obtain the color E-paper display device 20. The protective coating layer 26 may be a single layer, a multiple layer or a composite layer as described above to resist moisture or improve optical performance. The materials and the functions of the protective coating layer 26 are similar to those described in the above embodiment and verbose description is not given herein.

Referring back to FIG. 2C, the E-paper display device 10 according to the present invention includes the substrate 12, the driving circuit (not shown), the E-paper display layer 14 and the protective coating layer 16. The E-paper display layer 14 is formed on and driven by the driving circuit, and the protective coating layer 16 is coated on the surfaces of the e-paper display layer 14. The substrate 12 can be a glass substrate or a flexible plastic substrate. The driving circuit may include TFT array or other known driving circuit for display device. The E-paper display layer 14 can be, but not limited to an electrophoretic display layer.

In an embodiment, the protective coating layer 16 can be a composite film. For example, the protective coating layer 16 includes the moisture barrier film 162 and the optical film 164. The moisture barrier film 162 is directly in contact with the E-paper display layer 14 without interposed polymer substrate. The optical film 164 is disposed on the moisture barrier film 162. In detail, the moisture barrier film 162 can prevent moisture from entering the E-paper display layer 14, and is made of inorganic ceramics, organic polymers or organic/inorganic composites. Examples of these materials include silicon oxide ($SiO_x$), silicon nitride ($SiN_x$), parylene, polypropylene, amorphous silicon/parylene composite, or polypropylene/polyacrylate/aluminum composite. It is to be noted that the materials are not limited to the above-mentioned materials, and other transparent materials suitable for coating process and providing good moisture resistance are applicable. The optical film 164 is used to absorb or block ultraviolet rays. Examples of the optical film 164 include non-interference cut-off filter or interference cut-off filter. When the optical film 164 is the interference cut-off filter, the ultraviolet rays are blocked because of the interference effect. The interference cut-off filter may include multiple refractive films having varying refractive indexes. Examples of the refractive films include magnesium fluoride ($MgF_2$), zirconium dioxide ($ZrO_2$), and cerium(III) fluoride ($CeF_3$). Furthermore, the surface 165 of the optical film 164 can be treated or roughened to have rough surface which allows light scattering so as to reduce glare. Alternatively, an anti-glaring film (not shown) is provided on the surface 165 of the optical film 164 to reduce glare. Although the protective coating layer 16 is a multiple layer film in the embodiment, the protective coating layer 16 may be a single layer film such as a moisture barrier film or an optical film with moisture barrier function in other applications.

Referring back to FIG. 3B, the color E-paper display device 20 according to the present invention is similar to the E-paper display device 10 except that the E-paper display device 20 further includes a color filter layer 25. The color filter layer 25 is disposed between the E-paper display layer 24 and the protective coating layer 26. The color filter layer 25 may be implemented by a thermal transfer color filter layer.

The other elements such as the protective coating layer 26 and the E-paper display layer 24 are similar to those described in the above embodiment.

In conclusion, the E-paper display device according to the present invention includes a protective coating layer directly formed on and in contact with the E-paper display layer. Therefore, the bubbles affecting the optical performance of the E-paper display device do no appear. Accordingly, the performance and yield rate of the E-paper display device are improved. In addition, since the protective coating layer is directly formed by coating, the materials of the protective coating layer can be selected as required to improve the brightness or contrast of the E-paper display device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device, comprising:
   a substrate;
   a driving circuit, formed on the substrate;
   an E-paper display layer, formed on the driving circuit; and
   a protective coating layer, directly formed on the E-paper display layer by coating instead of adhering and in contact with the E-paper display layer without bubbles between the protective coating layer and the E-paper display layer.

2. The display device of claim 1, wherein the protective coating layer comprises a moisture barrier film.

3. The display device of claim 2, wherein the material of the moisture barrier film comprises inorganic ceramics, organic polymers or organic/inorganic composites.

4. The display device of claim 3, wherein the material of the moisture barrier film comprises silicon oxide, silicon nitride, parylene, polypropylene, amorphous silicon/parylene composite, or polypropylene/polyacrylate/aluminum composite.

5. The display device of claim 2, wherein the protective coating layer further comprises an optical film disposed on the moisture barrier film.

6. The display device of claim 5, wherein the optical film comprises a non-interference cut-off filter or an interference cut-off filter for absorbing or blocking ultraviolet rays.

7. The display device of claim 6, wherein the interference cut-off filter comprises multiple refractive films with varying refractive indexes.

8. The display device of claim 7, wherein the material of the refractive films comprises magnesium fluoride, zirconium dioxide, or cerium(III) fluoride.

9. The display device of claim 1, wherein the protective coating layer comprises an optical film for adjusting optical performance of the display device or providing moisture barrier function.

10. The display device of claim 1, further comprising an anti-glaring film disposed on the protective coating layer.

11. The display device of claim 10, wherein the anti-glaring film has a rough surface for reducing glare.

12. The display device of claim 1, wherein the substrate is a glass substrate or a flexible plastic substrate.

13. The display device of claim 1, wherein the E-paper display layer is an electrophoretic display layer.

14. The display device of claim 1, further comprising a color filter layer disposed between the E-paper display layer and the protective coating layer.

15. A method for manufacturing a display device, comprising
   steps of:
   providing a substrate;
   forming a driving circuit on the substrate;
   forming an E-paper display layer on the driving circuit; and
   forming a protective coating layer on the E-paper display layer directly by coating instead of adhering, the protective coating layer being in contact with the E-paper display layer without bubbles between the protective coating layer and the E-Paper display layer.

16. The method for manufacturing the display device of claim 15, wherein the step of forming the protective layer comprises a step of forming a moisture barrier film on the E-paper display layer by coating.

17. The method for manufacturing the display device of claim 15, wherein the step of forming the protective coating layer comprises a step of forming an optical film on the E-paper display layer by coating.

18. The method for manufacturing the display device of claim 17, further comprising a step of forming an anti-glaring film on the optical film.

19. The method for manufacturing the display device of claim 15, further comprising a step of forming a color filter layer on the E-paper display layer before the step of forming the protective coating layer.

20. The method for manufacturing the display device of claim 19, wherein the color filter layer is formed by a thermal transfer method, a pigment dispersion method, a printing method or an electrodeposition method.

* * * * *